May 8, 1923. Re. 15,595

J. A. BENNETT

ADJUSTABLE DRAINAGE FITTING FOR WATER CLOSETS, ETC

Filed Sept. 3, 1920

Inventor

Jackson A. Bennett

By Wm. B. Hodges

Attorney

Reissued May 8, 1923.

Re. 15,595

UNITED STATES PATENT OFFICE.

JACKSON A. BENNETT, OF LOS ANGELES, CALIFORNIA.

ADJUSTABLE DRAINAGE FITTING FOR WATER CLOSETS, ETC.

Original No. 1,410,526, dated March 21, 1922, Serial No. 407,944, filed September 3, 1920. Application for reissue filed January 5, 1923. Serial No. 610,933.

*To all whom it may concern:*

Be it known that I, JACKSON A. BENNETT, a citizen of the United States, residing at Los Angeles, in the county of Los Angeles and State of California, have invented new and useful Improvements in Adjustable Drainage Fittings for Water Closets, Etc., of which the following is a specification.

It is the object of this invention to provide drainage fittings for water closet bowls and the like, by the use of which the soil pipe employed in connection with a plurality of water closet bowls may be suitably inclined to obtain the desired drainage, and the plurality of water closet bowls readily attached to the inclined soil pipe while supporting the bowls at the same elevation. This result is accomplished by providing a soil pipe having vertically elongated openings at its connections with the respective bowls, the respective bowls being arranged to communicate with the soil pipe connections at any point along the elongated openings.

It is a further object of the invention to provide an improved baffle carried by the water closet bowls and projecting into the respective connections with the soil pipe.

It is a still further object of the invention to provide a construction whereby the weight of the water closet bowls is supported by the flooring and is not carried by the side wall from which the bowls extend.

Further objects of the invention will be readily understood from the following description of the accompanying drawings in which—

Figure 1:
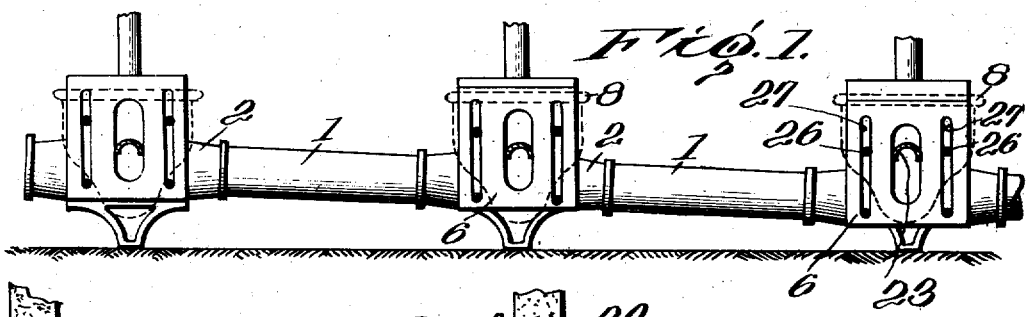
Figure 1 is a front elevation of an inclined soil pipe having a plurality of water closet bowls attached thereto at the same elevation by means of the improved fittings.
Figure 2:
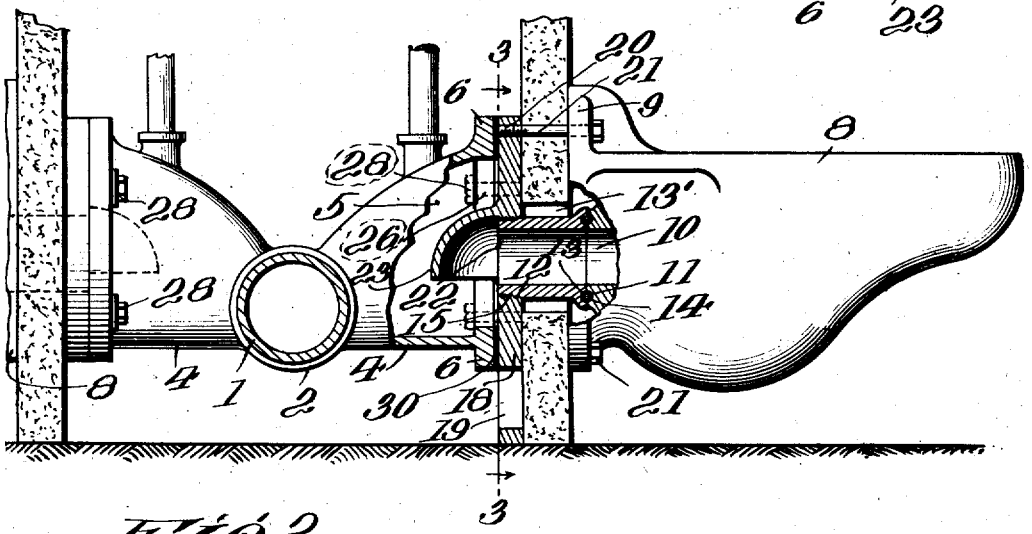
Figure 2 is a transverse section partly in elevation through a soil pipe having connections with water closet bowls at opposite sides of the soil pipe by means of the improved fittings.

In the drawings I have shown an inclined soil pipe adapted to have a plurality of water closet bowls connected to the same. The bowls preferably extend outwardly from a side wall, and the soil pipe is positioned at the rear of the side wall. As illustrated in Figure 2, the soil pipe may be positioned between two side walls, and water closet bowls may extend outwardly from each of said walls and be connected to the soil pipe by means of the improved fittings.

Figure 4:
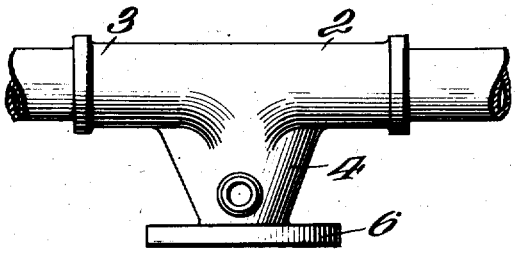
Figure 4 is a plan view of a portion of a soil pipe having inserted therein one of the connections of a fitting arranged to make connection with a water closet bowl at one side only of the soil pipe.

The soil pipe consists of pipe sections 1 connected by couplings 2, and it is arranged at any suitable inclination to obtain the desired drainage. The couplings 2 each consist of a body portion 3 open at its respective ends and arranged to receive the ends of pipe sections 1. A hollow extension 4 projects laterally from the body portion 3 in the form of the invention illustrated in Figure 4, and in the form of the invention illustrated in Figure 2 one of said lateral extensions projects from each side of the body portion 3. These lateral extensions form chambers 5 communicating with the bore of body portions 3 of the couplings, and said extensions are so arranged as to elongate the chambers 5 vertically with relation to the bore of the couplings, and form elongated open ends 5′ for said chambers. The lateral extensions preferably terminate in flanges 6 surrounding openings 5 and adapted to be received against the fittings of the water closet bowls arranged to communicate with the soil pipe.

One of the water closet bowls is shown at 8 as provided at its rear portion with a connecting flange 9 by which it is secured to a wall. The conduit leading from the bowl is shown at 10 as terminating in a flat surface 11 against which the end of a discharge nipple 12 is arranged to impinge. This nipple extends rearwardly from the bowl through a suitable opening 13′ in the side wall, and the end surface of the nipple adapted to abut against the end of conduit 10 is preferably provided with an annular groove 13, in which is received a gasket 14. The opposite end of the nipple has a threaded engagement 15 with a stationary plate of the fitting received against the inner surface of the side wall, and, by screwing the nipple with relation to this plate; the gasket 14 may be compressed in order to form a leak-proof connection between the nipple and the conduit of the water closet bowl.

Figure 3:
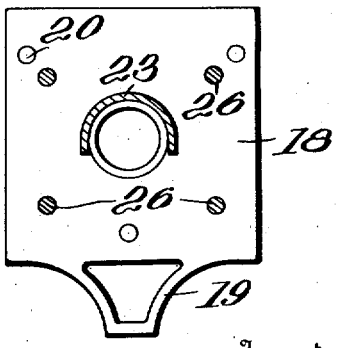
Figure 3 is a detail section on the line 3—3 of Figure 2.

The plate received against the inner surface of the side wall is shown in detail in Figure 3, and consists of a main portion 18 having the depending standard 19 adapted to rest upon the floor for supporting said plate. The plate is provided with bolt holes 20 adapted to receive bolts 21 extending through the flange 9 of the water closet bowl and through the side wall so as to be threaded into openings 20. By this arrangement it will be seen that the plate is supported from the floor, and the water closet bowl is supported by the plate, thereby relieving the side wall of the strain due to the weight of the bowl. The body portion 18 of the plate is provided with a central opening 22 having the threaded connection 15 with nipple 12, and a baffle 23 is preferably formed integral with the body portion of the plate. This baffle curves outwardly and downwardly over the opening 22 in spaced relation from the same, so as to direct the flow through the nipple 12 and opening 22 downwardly.

The couplings of the soil pipe are connected to the water closet bowls with the flanges 6 of the extensions 4 received against the respective plates 18. Since the water closet bowls and the plates 18 are supported from the floor, and all of the plates 18 are supported by standards 19 of the same length, the bowls and plates are at the same elevation. The soil pipe 1 is inclined, however, and the couplings are, therefore, at different elevations. As a consequence, the flanges 6 are received against plates 18 at different elevations. In order to connect the flanges 6 to the plates 18 at whatever point in elevation they may abut against one another, the plates 18 are provided with rearwardly projecting bolts 26, at the respective sides of the same. These bolts are in alinement with the flanges 6 at the sides of chamber 5, and are received through elongated slots 27 formed in the sides of flanges 6. By this arrangement vertical adjustment of the couplings of the drain relative to the plates 18 and the water closet bowls is possible. Nuts 28 are received upon the ends of bolts 26 so as to abut against the walls of slots 27 and thereby clamp the soil pipe couplings to the plates 18. In practice suitable gaskets 30 are preferably provided between the meeting surfaces of flanges 6 and the plates 18, in order to provide a leak-proof passageway through the openings 22 of the plates and into the chambers 5 of the couplings.

Various changes may be made in the construction, as thus described, without departing from the spirit of the invention.

What is claimed is:—

1. The combination with a soil pipe having elongated openings transversely of said soil pipe, of members adapted to communicate with said soil pipe and having openings leading into said elongated openings at any point along the latter.

2. The combination with a soil pipe having vertically elongated openings transversely of said soil pipe, of supporting plates having openings, means for connecting said plates to said soil pipe so that said plate openings communicate with said elongated openings at any point along the latter, and members supported by said plates and having discharges communicating with said plate openings.

3. The combination with a drain comprising sections connected by coupling members, said couplings having lateral chambers the ends of which form elongated openings, flanges surrounding said openings, supporting plates, plumbing elements provided with discharges supported by said plates, said plates having openings communicating with said discharges, said coupling flanges being received against said plates with the plate openings communicating with said elongated openings at any point along the latter, and means for connecting said plates to said flanges at adjusted points.

4. A drainage fitting for water closets comprising a series of inclined pipe sections, and couplings uniting and maintainng said sections in alignment, each coupling being formed with a laterally disposed receiving chamber closed by a front wall having a vertically disposed elongated opening therein, whereby water closet nipples extended through the respective openings may be maintained in horizontal alignment irrespective of the inclination of the pipe sections.

5. A fitting for inclined soil pipes comprising a coupling having means whereby it may be connected with a soil pipe, and a receiving chamber provided with a front wall having a vertically disposed elongated opening therein capable of receiving a water closet nipple of fixed height irrespective of variations in the relative elevation of said soil pipe.

6. A drainage fitting for water closets comprising a series of inclined pipe sections, couplings uniting said sections, each coupling being formed with a laterally disposed receiving chamber closed by a front wall having a vertically disposed elongated opening therein, whereby water closet nipples extended through the respective openings may be maintained in horizontal alignment irrespective of the inclination of the pipe sections, horizontally aligned supports one for each coupling, and means connecting the couplings to the supports at progressively different heights conforming to the inclination of the pipe sections.

7. A drainage fitting for water closets comprising a series of inclined pipe sections, couplings uniting said sections, each coupling being formed with a laterally disposed receiving chamber closed by a front wall having a vertically disposed elongated opening therein, whereby water closet nipples extended through the respective openings may be maintained in horizontal alignment irrespective of the inclination of the pipe sections, horizontally aligned supports one for each coupling, means adjustably connecting the couplings to the respective supports, and water closet bowls sustained by the respective supports.

8. A drainage fitting for water closets comprising a series of inclined pipe sections, couplings uniting said sections, each coupling being formed with a laterally disposed receiving chamber closed by a front wall having a vertically disposed elongated opening therein, whereby water closet nipples extended through the respective openings may be maintained in horizontal alignment irrespective of the inclination of the pipe sections, a plurality of water closet bowls, one for each coupling, and a common support means for the couplings and water closet bowls sustaining the weight of the latter independently of said pipe sections.

In testimony whereof I have signed my name to this specification.

JACKSON A. BENNETT.